April 23, 1940.    G. E. BARNHART    2,198,150
WATER CULTURE APPARATUS
Filed May 29, 1939    2 Sheets-Sheet 1
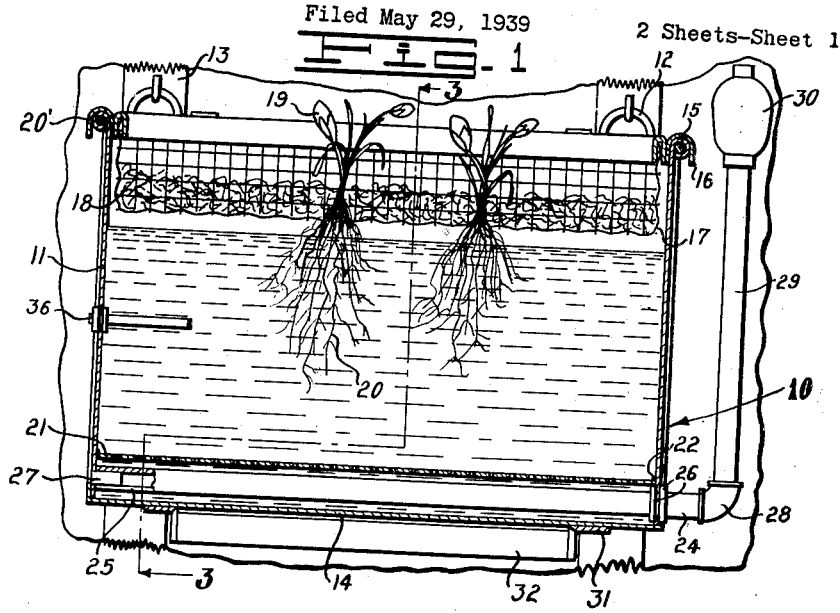
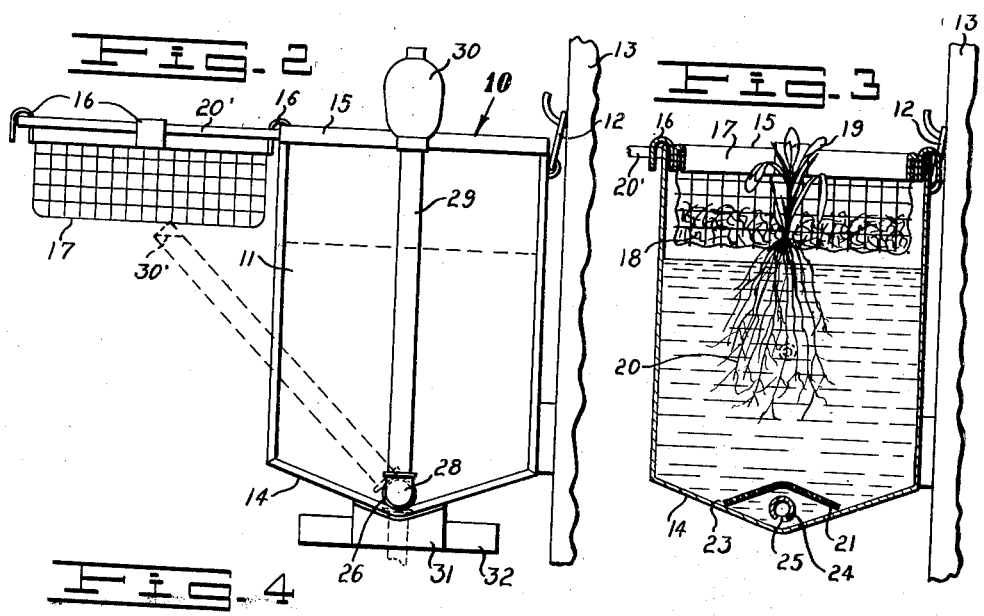
INVENTOR.
G. E. BARNHART
ATTORNEY.

April 23, 1940.  G. E. BARNHART  2,198,150
WATER CULTURE APPARATUS
Filed May 29, 1939  2 Sheets-Sheet 2
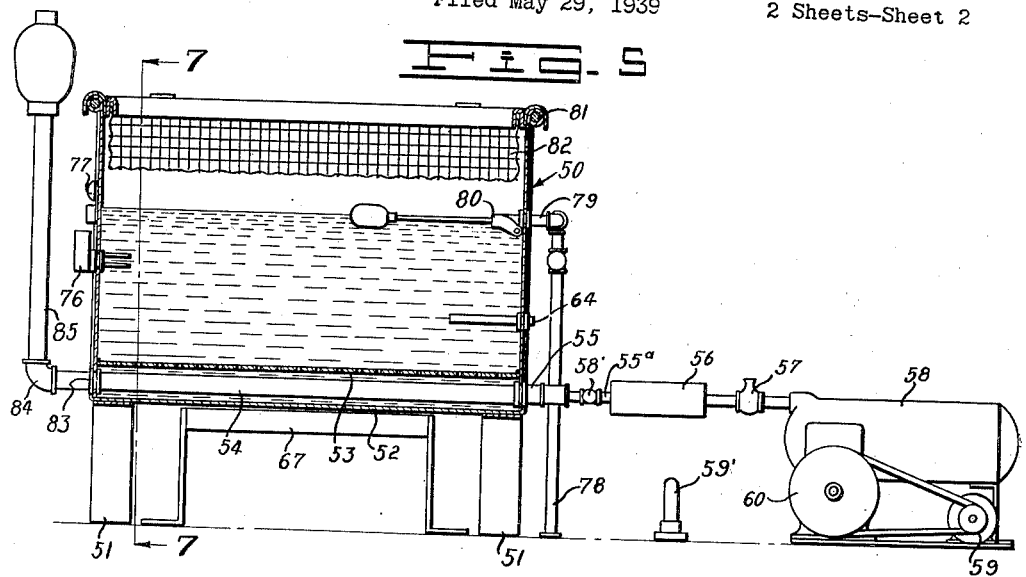
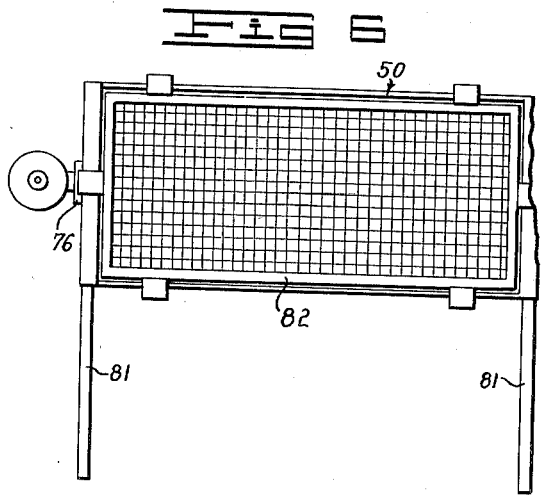
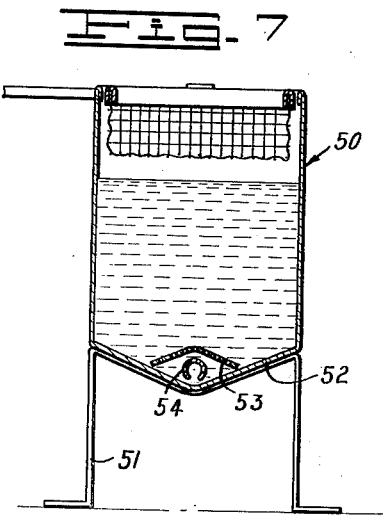
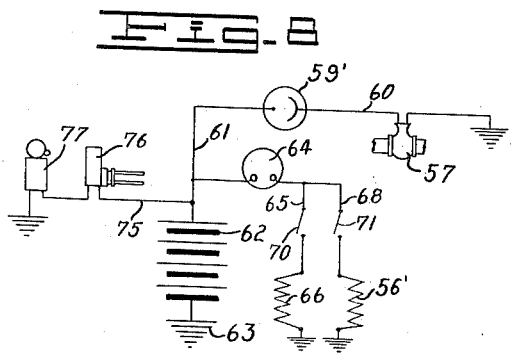
INVENTOR.
G. E. BARNHART
BY
ATTORNEY.

Patented Apr. 23, 1940

2,198,150

UNITED STATES PATENT OFFICE 2,198,150

WATER CULTURE APPARATUS

George E. Barnhart, Pasadena, Calif.

Application May 29, 1939, Serial No. 276,380

11 Claims. (Cl. 47—1.2)

This invention relates to water culture apparatus.

The general object of the invention is to provide an improved apparatus for cultivating plants under what is known as tank or tray culture.

A more specific object of the invention is to provide an improved tank apparatus which includes various novel features promoting rapid growth of plants.

Another object of the invention is to provide a water culture apparatus including a novel tank structure.

Another object of the invention is to provide a water culture apparatus including a novel tank heating means.

Another object of the invention is to provide a novel means for aerating the fluid in a water culture tank.

Another object of the invention is to provide novel means for heating air and discharging it into a water culture apparatus tank.

Another object of the invention is to provide a novel indicating means for indicating the condition of the solution in the water culture tank.

Another object of the invention is to provide a novel combined aerating means, water level indicating means and draining means.

Another object of the invention is to provide a novel light control apparatus for governing the aeration of a water culture apparatus tank.

Other objects and the advantages of this invention will be apparent from the following description taken in connection with the accompanying drawings, wherein:

Fig. 1 is a central sectional view through a tank embodying the features of my invention;

Fig. 2 is an end view of the tank with the tray arranged at the side of the tank;

Fig. 3 is a section taken on broken line 3—3, Fig. 1;

Fig. 4 is a wiring diagram;

Fig. 5 is a central sectional view, partly in elevation, showing a modification;

Fig. 6 is a top plan view of the modification;

Fig. 7 is a section taken on line 7—7, Fig. 5; and

Fig. 8 is a wiring diagram of the modification.

Referring to the drawings by reference characters I have shown my invention as embodied in a water culture apparatus which is indicated generally at 10. As shown the invention includes a tank 11 which may be supported by suitable hooks 12 upon a wall or support 13. The tank 11 is shown as rectangular and with a bottom 14 which slopes towards the middle of the tank.

In water culture apparatus it is essential that the nutrient solution be kept under certain conditions of temperature and solution strength and that the plants be supported in baskets or other means so that the roots may dip into the tank.

In my construction the tank includes an upper rim 15 which supports hooks 16 on a wire basket 17. The basket receives suitable excelsior or other suitable material 18 so that the plants 19 are supported in the basket with excelsior while the roots 20 of the plant dip down into the solution in the tank 11. The tank includes rods 20' which project from the tank and serve to support the tray.

When the tray is in the position shown in Figs. 1 and 3 the plants are in feeding position while when the tray is in the position shown in Fig. 2 the plants are in airing position.

The tank includes a baffle 21 the ends of which are secured as by welding to the tank as at 22. The baffle has converging side walls which are spaced as at 23 from the tank bottom 14 to allow circulation beneath the baffle.

Rotatably mounted within the tank and beneath the baffle I show a conduit member 24 which is preferably cylindrical and which has an opening, shown as a slot 25, which extends substantially the full length thereof. The conduit member is rotatably mounted between collars 26 in water tight relation with the tank at one end while the other end may be mounted on a spindle 27 within the tank.

The conduit member extends without the tank and receives an elbow 28 from which a pipe 29 extends. The pipe threadedly receives a rubber bulb 30. The bulb is so constructed that when squeezed the air in the bulb is forced through the pipe 29 and conduit 24 and out through the slot 25 so that the entire tank is aerated.

The bulb may be removed and the pipe 29 rotated to the position shown at the left in Fig. 2 where at 30' the water level is indicated in the tank. Thus the operator may determine the water level which is frequently obscured by the growth of plants and by the excelsior or other material in the basket.

By further rotating the pipe from the position at the left in Fig. 2 to the dotted line position beneath the tank, the tank may be drained preparatory to refilling the tank with fresh nutrient solution.

Beneath the tank I show brackets 31 which support an electric heating member 32. One element 33 of the heating member is grounded as at 34 and is connected by a lead 35 with a thermostat 36 in the tank. The thermostat is in circuit with a source of current 37 and a ground 38 and the construction is such that as the temperature of the liquid in the container drops the heating element 33 will function thus heating the solution in the tank.

In Figs. 5 to 8 I show a modification of my invention wherein the tank 50 is mounted on suitable legs 51. The tank is similar to the tank previously described and includes a bottom 52 with a baffle 53 therein and with an aerating conduit 54. This aerating conduit is rotatably connected at one end by a fitting 55 to a pipe 55a with an electrically heated air warmer 56 which communicates through a valve 57 with a tank 58. The pipe 55a includes a manually operable valve 58'. The tank 58 is adapted to be filled with compressed air by means of a motor 59 and a compressor 60 and the construction is such that whenever the pressure in the tank 58 drops below a certain point the blower will be operated until sufficient pressure is built up in the tank 58.

The valve 57 is electrically operated and is controlled by a photoelectric cell 59'. The cell 59' includes a lead 60 to the valve control mechanism and includes a lead 61 to a current source 62 which is grounded at 63 and the construction is such that when the intensity of light striking the photoelectric cell decreases the valve 57 is closed and when the light is increased the valve is opened.

The tank 50 is provided with a thermostat 64 which is in circuit with the source 62 and with a switch 65 to a heating element 66 which is disposed within a receptacle 67 mounted beneath the tank. The thermostat is also in circuit by means of a lead 68 with the heating element 56' in the warmer 56 previously described. The leads 65 and 68 include suitable switches 70 and 71 by means of which the current to the heating elements may be selectively turned on or off. As a result of the heating arrangement when the temperature of the solution in the tank drops, the heating elements are energized provided their respective switches are closed.

The source 62 is in circuit by means of a lead 75 with a milliammeter 76 which includes spaced exposed terminals which are below the normal fluid level in the tank. As the solution density drops the flow of the current between the terminals is varied so that an alarm bell 77 is sounded under a predetermined condition.

The tank is provided with water or with solution by means of a pipe 78 connected to a suitable source. This pipe includes a connection 79 which communicates with a float control valve 80 in the tank so that a constant level is maintained in the tank 50.

The tank 50 includes laterally extending support rods 81 by means of which a basket 82 similar to the basket 70 previously described may be supported without the tank. When in normal position the basket is supported in the tank.

The conduit 54 at the end remote from the heater 57 projects from the tank through a fluid tight packing 83 and includes an elbow 84 and a pipe 85 which normally extend upwardly but which can be turned to serve as a water gauge or as a drain similar to the pipe 29.

In the use of the modification the proper solution is placed in the tank and the plants are placed in the basket. As the temperature varies in the tank the thermostat 64 controls the heater 67 to vary the temperature of the water and during the daytime the valve 57 being opened by the photoelectric cell compressed air is driven into the tank and this air is heated by the heater 56 when the temperature of the water drops.

When the liquid level in the tank drops, the float valve 80 causes fresh fluid to enter the tank. As the solution density drops, the milliammeter acts to sound the alarm 77 so that the operator may place fresh nutrient material or fresh solution in the tank.

In water culture it has been found desirable to maintain a level in the tank. After withdrawal or evaporation to a lower level the new level should be maintained as refilling a partially spent tank is not deemed good practice. The tubes 29 and 85 when tilted thus serve to prevent filling the tank to an undesired level.

From the foregoing description it will be apparent that I have invented a novel water culture apparatus by means of which very efficient control is secured, all with a minimum of expense.

Having thus described my invention, I claim:

1. In a water culture apparatus, a tank, a tray in said tank, said tank having a bottom, an aerating conduit arranged in the tank, said conduit having an outlet therein, means to supply air to the conduit, and means to heat air passing through said conduit.

2. In a water culture apparatus, a tank, said tank having a bottom which slopes downwardly from each side, a baffle extending along the tank, an areating conduit arranged beneath said baffle and in the tank, said conduit having an aperture in the wall thereof, and an air compressing means connected to said conduit.

3. In a water culture apparatus, a rectangular tank having an exposed upper edge, spaced rods projecting from said tank and parallel with two edges of the tank, a tray, said tray having hooks thereon engaging the upper periphery of the tank, said hooks being disposed so that they may engage said rods when removed from the tank.

4. In a water culture apparatus, a tank, a tray removably mounted in the upper portion of the tank, said tank having a bottom which slopes downwardly, a baffle extending along the bottom of said tank, there being a space between the baffle and tank, and an aerating conduit arranged beneath said baffle in the tank.

5. In a water culture apparatus, a tank having a bottom, an aerating conduit arranged in the tank, said conduit having an opening in the wall thereof, means to rotatably mount the conduit in the tank, a pipe extending upwardly from said conduit, said conduit being movable from a vertical position to an inclined position to indicate the water level of the tank.

6. In a water culture apparatus, a tank, means to support the tank, an aerating tube in said tank, a source of compressed air, means connecting said source of compressed air and said aerating tube, said connecting means including a valve, means for closing and opening said valve, said connecting means including a heating member for heating air passing through the connecting means, and means to control said heating means.

7. In a water culture apparatus, a tank, means to support the tank, an aerating tube in said tank, a source of compressed air, means connecting said source of compressed air and said aerating tube, said connecting means including a manually operable valve, a second valve in said connecting means, photoelectric means for closing and opening said second mentioned valve, said connecting means including a heating member for heating air passing through the connecting means, a thermostat in said tank, and means whereby said thermostat controls said heating means.

8. In a water culture apparatus, a tank having an exposed upper edge, a tray, said tray having hooks thereon engaging the upper periphery of the tank, said tank having a bottom which slopes downwardly from each side, a baffle extending the length of said tank and secured to the ends thereof there being a space at each side of the baffle between the baffle and the tank, an aerating conduit arranged beneath said baffle in the tank, said conduit having a slot in the lower wall thereof, a pipe extending upwardly from said conduit, and a bulb removably mounted on said pipe.

9. In a water culture apparatus, a tank, means to support the tank, an aerating tube in said tank, a source of compressed air, means connecting said source of compressed air and said aerating tube, said connecting means including a manually operable valve, a second valve in said connecting means, photoelectric means for closing and opening said second mentioned valve, said connecting means including a heating member for heating air passing through the connecting means, a thermostat in said tank, means whereby said thermostat controls said heating means, a second heating means beneath the tank, and means whereby said thermostat controls said second heating means.

10. In a water culture apparatus, a tank, means to support the tank, an aerating tube in said tank, a source of compressed air, means connecting said source of compressed air and said aerating tube, said connecting means including a manually operable valve, a second valve in said connecting means, photoelectric means for closing and opening said second mentioned valve, said connecting means including a heating member for heating air passing through the connecting means, a thermostat in said tank, means whereby said thermostat controls said heating means, a second heating means beneath the tank, means whereby said thermostat controls said second heating means, float control means to supply liquid to the tank, a milliammeter in said tank, a signal operated by said milliammeter and a single source of current for operating said milliammeter and its signal, said thermostat switch and both of said heating elements and said photoelectric cell and its associated valve.

11. In a water culture apparatus, a tank for a liquid, a plant receptacle in the upper part of said tank, said tank having a bottom, an aerating conduit, said conduit having outlet means arranged along the tank and disposed above the bottom of the tank and below said plant receptacle, and an air compressing means connected to said conduit to supply air thereto whereby air under pressure may be forced through the root systems to stir the roots and aerate the same.

GEORGE E. BARNHART.